(12) United States Patent
Fujiwara

(10) Patent No.: US 8,107,239 B2
(45) Date of Patent: Jan. 31, 2012

(54) ELECTRONIC APPARATUS AND COOLING FAN

(75) Inventor: Nobuto Fujiwara, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 38 days.

(21) Appl. No.: 12/642,216

(22) Filed: Dec. 18, 2009

(65) Prior Publication Data

US 2010/0220445 A1    Sep. 2, 2010

(30) Foreign Application Priority Data

Feb. 27, 2009  (JP) ................. 2009-045934

(51) Int. Cl.
*H05K 7/20* (2006.01)
*F01D 5/08* (2006.01)
*F04D 29/64* (2006.01)
*F04B 17/03* (2006.01)

(52) U.S. Cl. ........ 361/695; 361/694; 415/176; 415/178; 415/203; 417/423.14; 417/423.15

(58) Field of Classification Search ............. 361/679.46, 361/679.48, 694, 695
See application file for complete search history.

(56) References Cited

U.S. PATENT DOCUMENTS

| | | | |
|---|---|---|---|
| 6,375,440 B2 | 4/2002 | Kosugi | |
| 7,248,473 B2 * | 7/2007 | Ohnishi et al. ................. | 361/695 |
| 7,325,590 B2 * | 2/2008 | Kim et al. ................. | 165/104.33 |
| 7,458,415 B2 * | 12/2008 | Hashimoto et al. .......... | 165/80.3 |
| 7,529,085 B2 * | 5/2009 | Makley et al. ............ | 361/679.48 |
| 7,697,288 B2 * | 4/2010 | Okutsu ......................... | 361/695 |
| 7,751,190 B2 * | 7/2010 | Fujiwara ....................... | 361/700 |
| 2003/0053296 A1 | 3/2003 | Tanaka et al. | |
| 2003/0142476 A1 * | 7/2003 | Tomioka et al. .............. | 361/695 |
| 2003/0161102 A1 * | 8/2003 | Lee et al. ...................... | 361/687 |
| 2006/0232934 A1 | 10/2006 | Kusamoto et al. | |
| 2007/0131383 A1 * | 6/2007 | Hattori et al. ................. | 165/11.2 |
| 2008/0037227 A1 | 2/2008 | Fujiwara | |
| 2008/0257529 A1 * | 10/2008 | Fujiwara .................. | 165/104.14 |
| 2009/0185349 A1 * | 7/2009 | Hata ............................ | 361/697 |

FOREIGN PATENT DOCUMENTS

| | | |
|---|---|---|
| JP | 7176882 | 7/1995 |
| JP | 8263162 | 10/1996 |

(Continued)

OTHER PUBLICATIONS

Japanese Patent Application No. 2010-166393, Notice of Reasons for Rejection, mailed May 31, 2011, (with English Translation).

(Continued)

*Primary Examiner* — Gregory Thompson
(74) *Attorney, Agent, or Firm* — Blakely, Sokoloff, Taylor & Zafman LLP

(57) ABSTRACT

According to one embodiment, an electronic apparatus is provided with a housing, a circuit board in the housing, fan blades configured to rotate and blow air in a centrifugal direction, and a casing which contains the fan blades. The casing includes an exhaust port and a cut portion which opens in a centrifugal direction different from a direction in which the exhaust port opens, from a perspective of a rotation center of the fan blades, and into which a part of the circuit board is inserted.

10 Claims, 15 Drawing Sheets

FOREIGN PATENT DOCUMENTS

| | | |
|---|---|---|
| JP | 2001-99098 | 4/2001 |
| JP | 2003092483 | 3/2003 |
| JP | 2003258472 | 9/2003 |
| JP | 2003-304085 | 10/2003 |
| JP | 2004-200721 | 7/2004 |
| JP | 2006-147618 | 6/2006 |
| JP | 2006301715 | 11/2006 |
| JP | 2007310716 | 11/2007 |
| JP | 2008-291819 | 12/2008 |

OTHER PUBLICATIONS

Japanese Patent Application No. 2009-045934, Notice of Reasons for Rejection, mailed Feb. 23, 2010, (with English Translation).

Japanese Patent Application No. 2011-184522, Notice of Reasons for Rejection, mailed Nov. 8, 2011, (with English Translation).

* cited by examiner

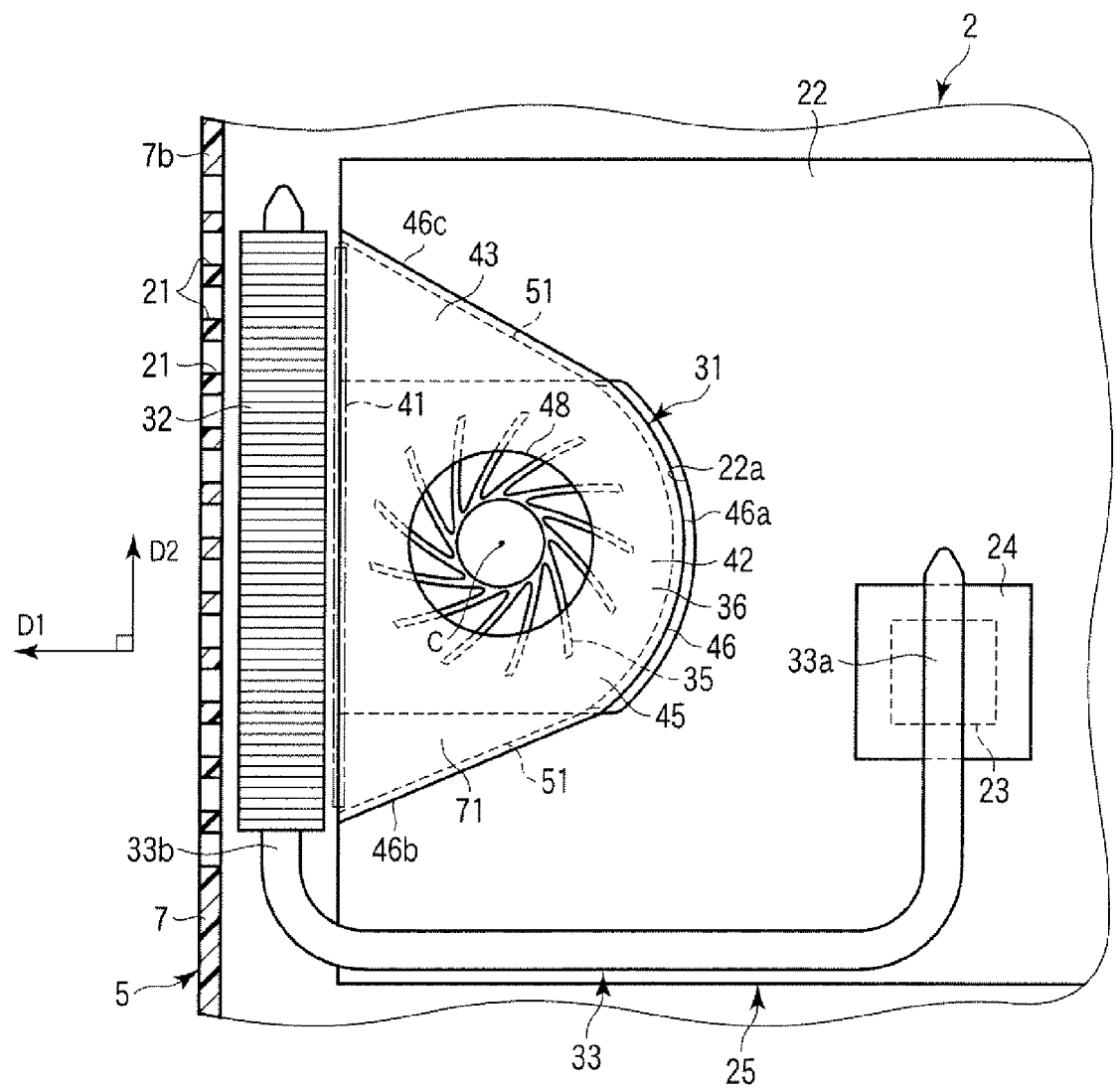
F I G. 11

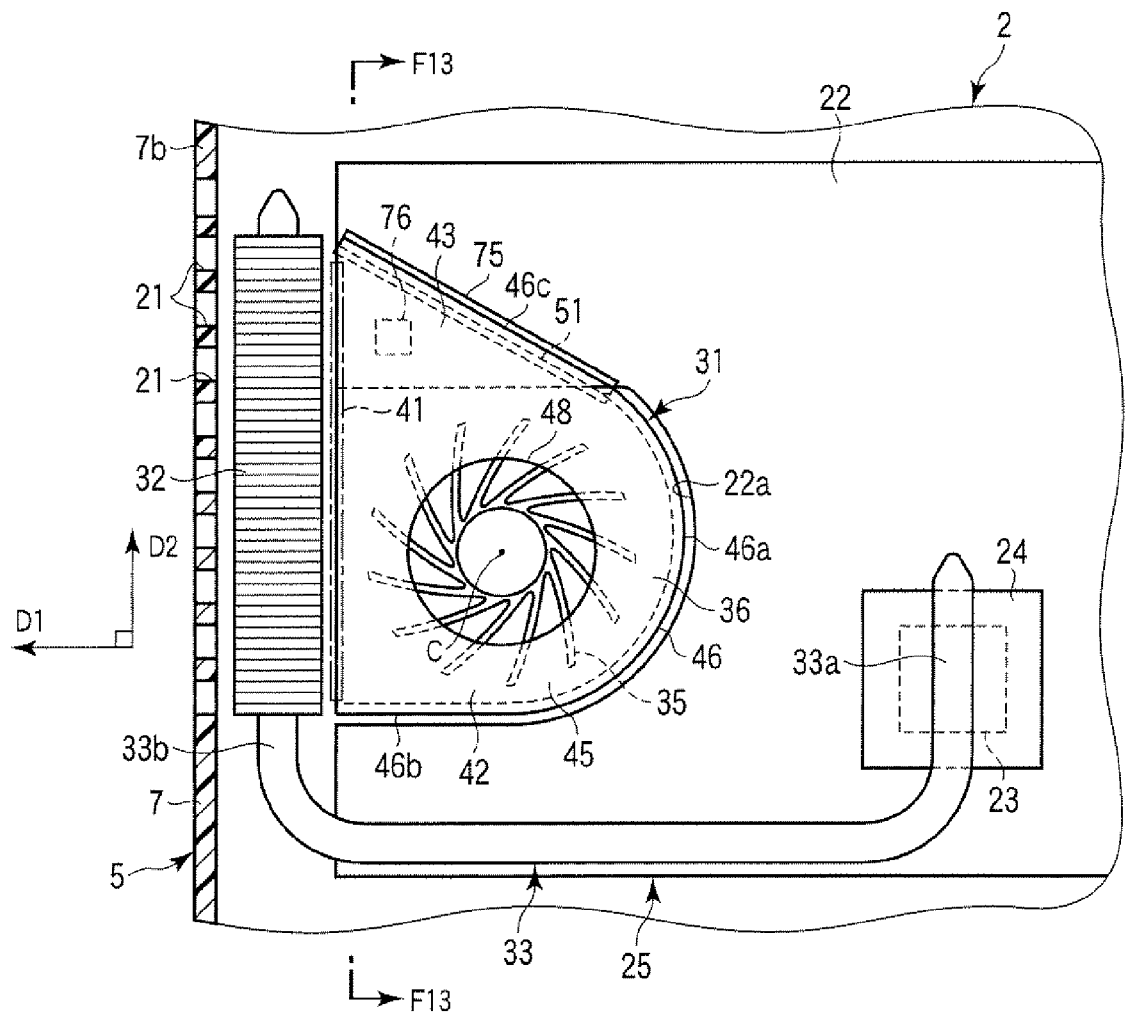
F I G. 12

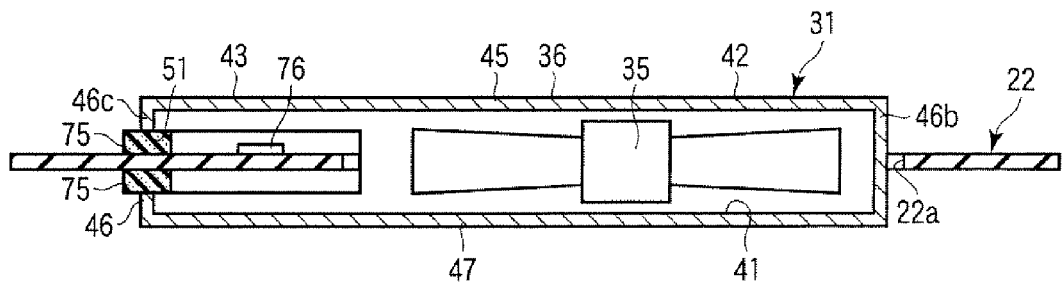
F I G. 13
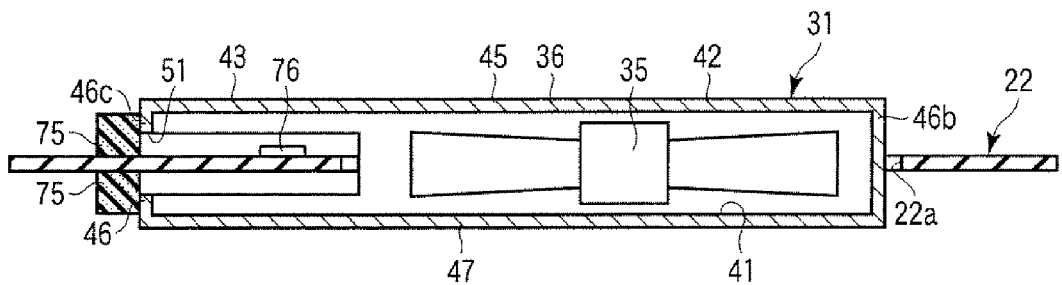
F I G. 14
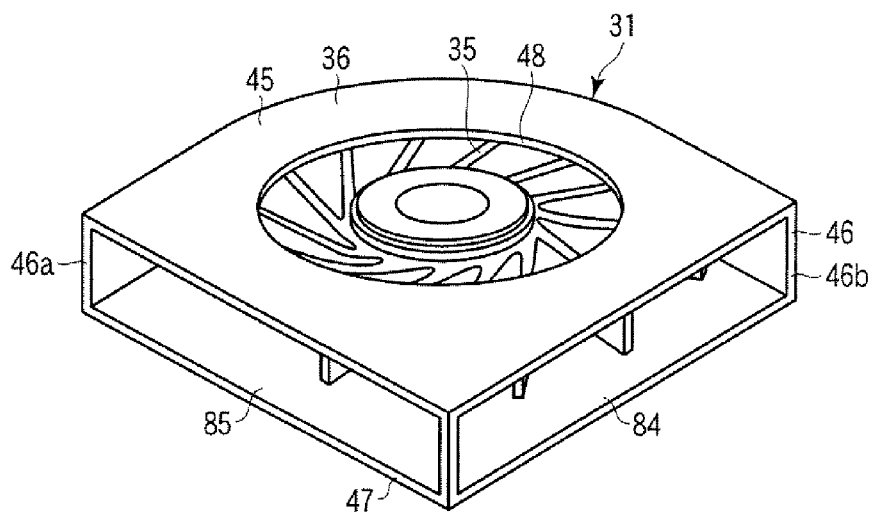
F I G. 15

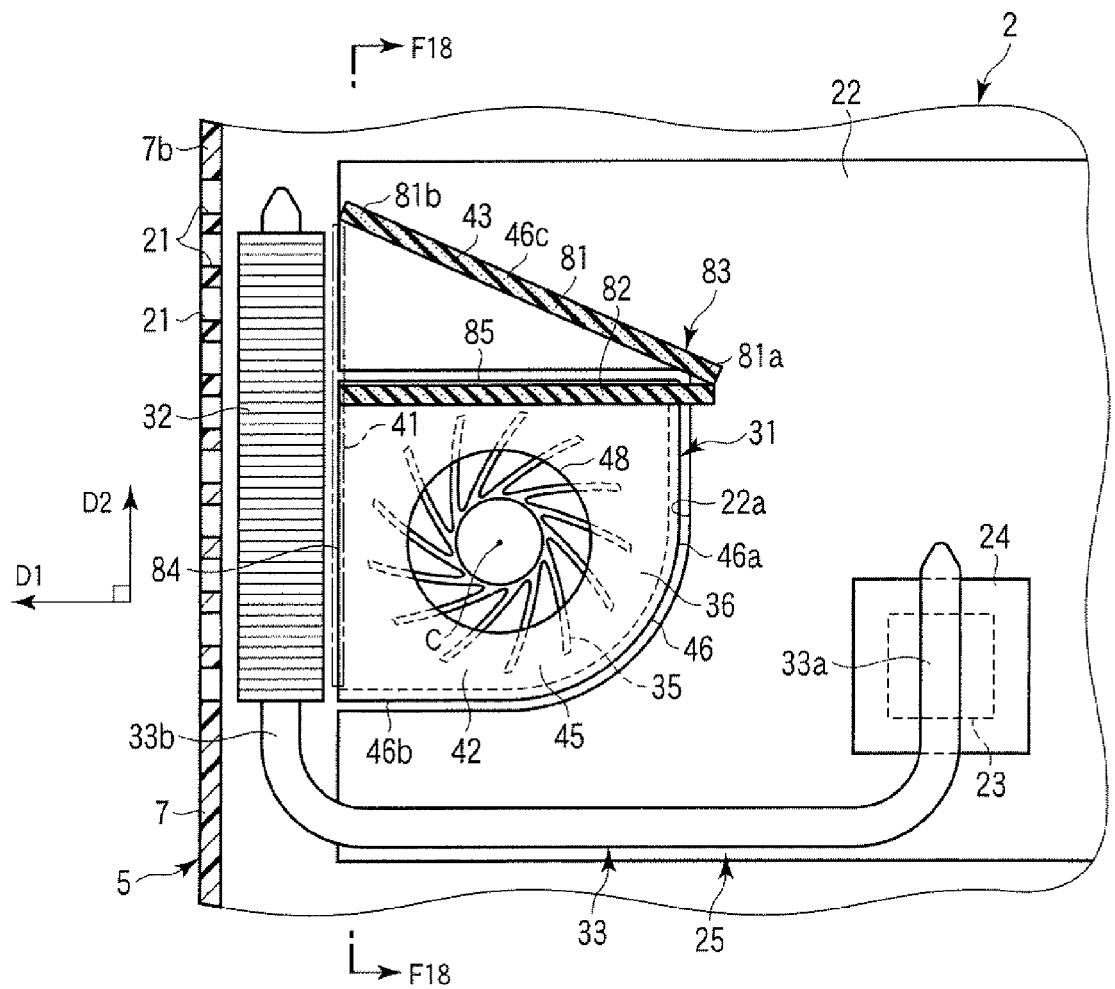
F I G. 16

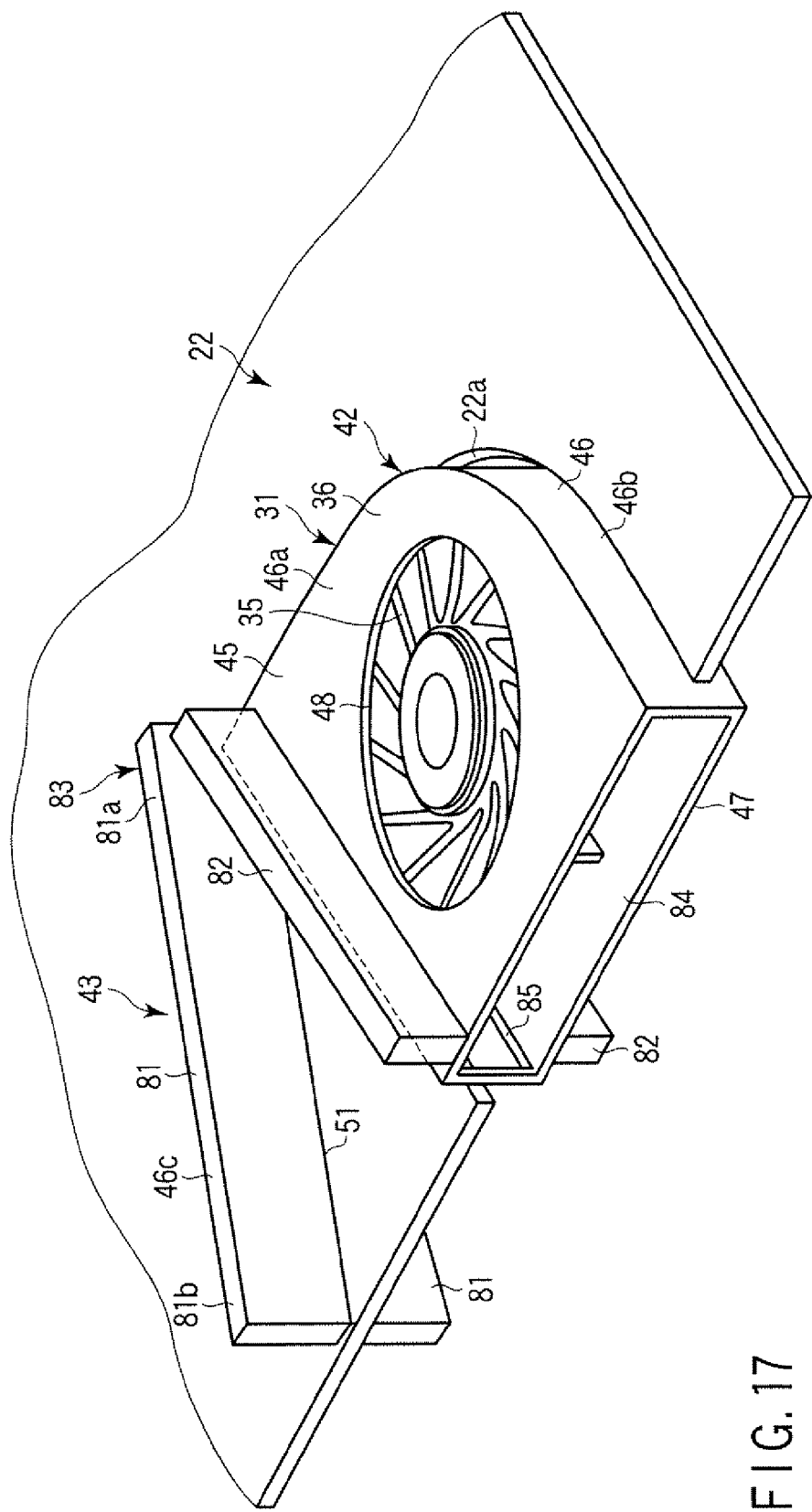
F I G. 17

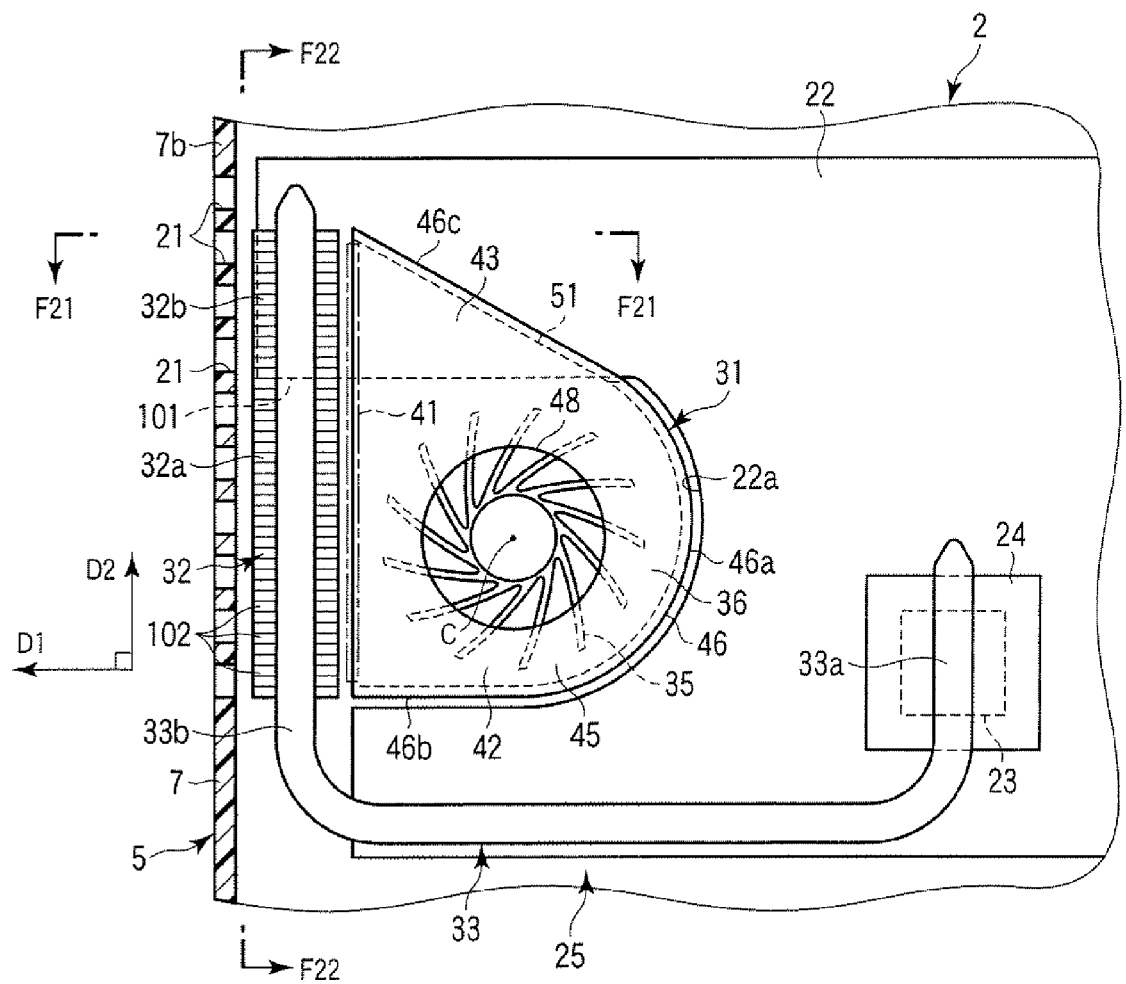
F I G. 20

ELECTRONIC APPARATUS AND COOLING FAN

CROSS-REFERENCE TO RELATED APPLICATIONS

This application is based upon and claims the benefit of priority from Japanese Patent Application No. 2009-045934, filed Feb. 27, 2009, the entire contents of which are incorporated herein by reference.

BACKGROUND

1. Field

One embodiment of the invention relates to a technique associated with a cooling structure for cooling a heating component of an electronic apparatus.

2. Description of the Related Art

An electronic apparatus such as a portable computer is provided with a cooling structure for cooling a heating component mounted in a housing.

A fan unit, a unitized assembly, is disclosed in Jpn. Pat. Appln. KOKAI Publication No. 2001-99098. The fan unit is provided with a fan box, cooling fan contained in the fan box, and cover that closes an opening of the fan box. An opening to be fitted with a printed board is formed in a side face of the fan box. The printed board is contained in the fan box so that its card edge projects from the fan box through the opening.

These days, the heating values of heating components mounted in electronic apparatuses such as portable computers tend to further increase. Therefore, a cooling structure for an electronic apparatus needs to have improved cooling performance. If a large cooling fan is installed, however, the mounting area of the housing and hence the area of the circuit board are restricted correspondingly.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 11 is an exemplary sectional view of a portable computer according to a fifth embodiment of the invention;

FIG. 12 is an exemplary sectional view of a portable computer according to a sixth embodiment of the invention;

FIG. 13 is an exemplary sectional view of a cooling fan and circuit board taken along line F13-F13 of FIG. 12;

FIG. 14 is an exemplary sectional view of a cooling fan and circuit board according to a modification of the sixth embodiment;

FIG. 15 is an exemplary perspective view of a cooling fan according to a seventh embodiment of the invention;

FIG. 16 is an exemplary sectional view of a portable computer according to the seventh embodiment;

FIG. 17 is an exemplary perspective view of a cooling fan and circuit board according to the seventh embodiment;

FIG. 20 is an exemplary sectional view of a portable computer according to a ninth embodiment of the invention;

DETAILED DESCRIPTION

Various embodiments according to the invention will be described hereinafter with reference to the accompanying drawings. In general, according to one embodiment of the invention, an electronic apparatus comprises (i) a housing; (ii) a circuit board in the housing; (iii) fan blades configured to rotate and blow air in a centrifugal direction; and (iv) a casing which contains the fan blades and comprises an exhaust port and a cut portion which opens in a centrifugal direction different from a direction in which the exhaust port opens, from a perspective of a rotation center of the fan blades, and into which a part of the circuit board is inserted.

Embodiments of the present invention applied to portable computers will now be described with reference to the accompanying drawings.

First Embodiment

Figure 1:
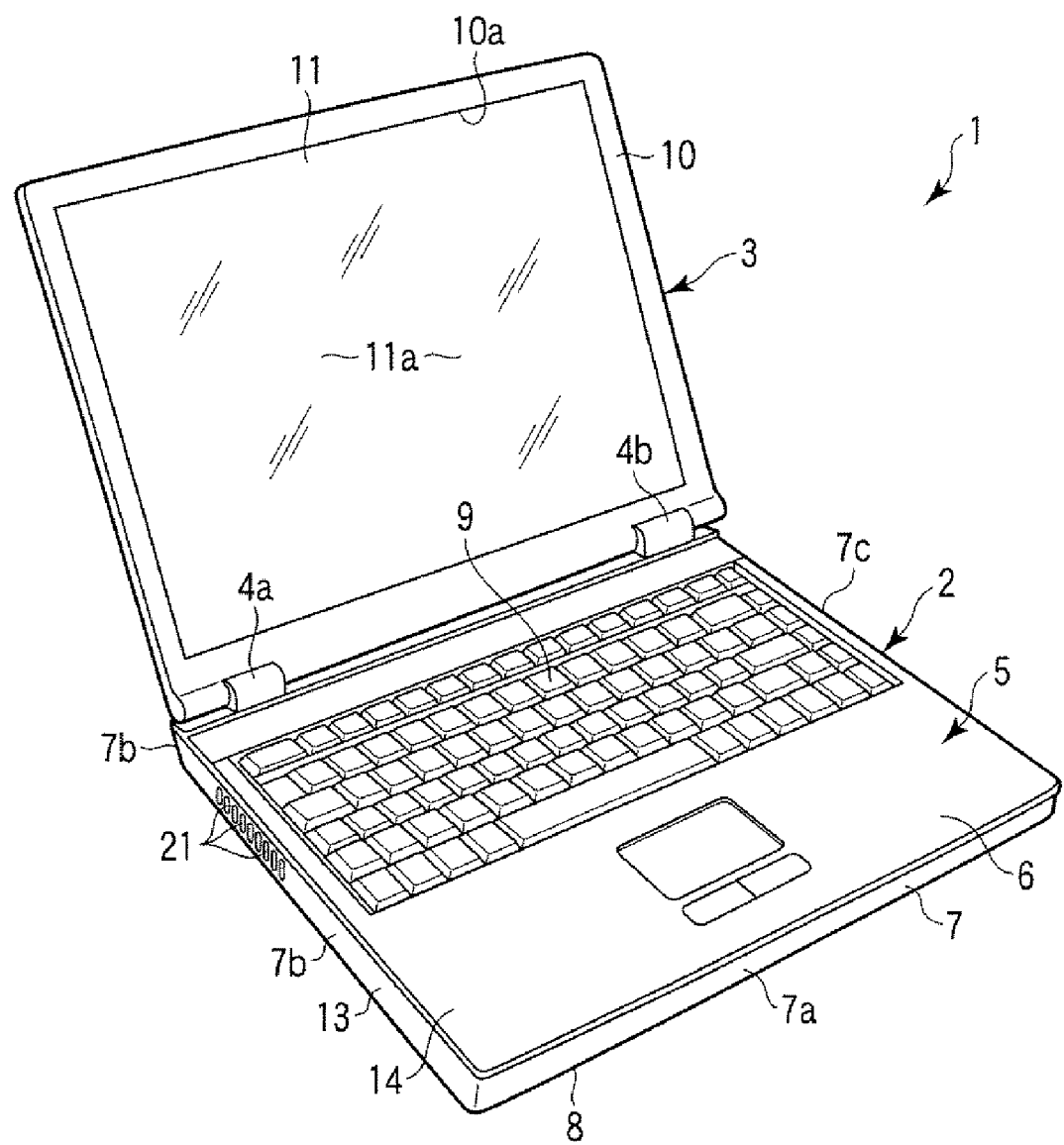
FIG. 1 is an exemplary perspective view of a portable computer according to a first embodiment of the invention.

FIGS. 1 to 7 show a portable computer 1 as an electronic apparatus according to a first embodiment of the invention. As shown in FIG. 1, the computer 1 is provided with a main unit 2, display unit 3, and hinge parts 4a and 4b.

The main unit 2 is a main body of the electronic apparatus mounted with a main board. The main unit 2 comprises a housing 5 in the form of a flat box. The housing 5 comprises an upper wall 6, peripheral wall 7, and lower wall 8. The lower wall 8 has a surface that is opposed to a mounting surface (e.g., desktop) when the portable computer 1 is placed on the mounting surface. The lower wall 8 is configured to spread substantially parallel to the mounting surface.

The upper wall 6 spreads substantially parallel to the lower wall 8 with a space between them. The upper wall 6 supports a keyboard 9. The peripheral wall 7 stands upright on the lower wall 8 so as to connect the respective peripheral edge portions of the lower and upper walls 8 and 6.

As shown in FIG. 1, the display unit 3 is provided with a display housing 10 and display device 11 contained in the housing 10. The display device 11 comprises a display screen 11a. The display screen 11e is exposed to the outside of the display housing 10 through an opening 10a in a front face of the display housing 10.

The display unit 3 is supported on a rear end part of the housing 5 by, for example, a pair of hinge parts 4a and 4b. The display unit 3 is pivotable between a closed position in which it is leveled so as to cover the upper wall 6 of the housing 5 from above and an open position in which it is raised on the upper wall 6.

The following is a detailed description of the housing 5 of the main unit 2.

As shown in FIG. 1, the housing 5 comprises a housing base 13 and housing cover 14. The housing base 13 is in the form of an open-topped box comprising the lower wall 8 and part of the peripheral wall 7. The housing cover 14 comprises the upper wall 6 and part of the peripheral wall 7. The housing cover 14 is assembled to the housing base 13 from above, for example. The housing 5 is formed by combining the housing cover 14 with housing base 13.

The peripheral wall 7 of the housing 5 comprises a front wall 7a, left and right sidewalls 7b and 7c, and rear wall 7d. The front wall 7a is located on that end part (front end part) of the housing 5 which is opposite from the end part on which the hinge parts 4a and 4b are arranged. The front wall 7a is configured to face a user when the portable computer 1 is operated. In this specification, the forward, rearward, leftward, and rightward directions are defined with respect to the user. The front wall 7a extends in the longitudinal direction (left-right direction) of the housing 5.

The rear wall 7d is located on that end part (rear end part) of the housing 5 on which the hinge parts 4a and 4b are arranged. The rear wall 7d extends substantially parallel to the front wall 7a. The left sidewall 7b extends in the width direction (front-rear direction) of the housing 5 so as to connect the respective left end parts of the front and rear walls 7a and 7d. The right sidewall 7c extends in the width direction (front-rear direction) of the housing 5 so as to connect the respective right end parts of the front and rear walls 7a and 7d.

As shown in FIG. 1, the left sidewall 7b, for example, is provided with, for example, a plurality of exhaust holes 21. The exhaust holes 21 are provided in the left sidewall 7b and open in one direction (hereinafter referred to as the first direction D1). The first direction D1 is oriented toward the left side of the portable computer 1. The exhaust holes 21 may be provided in the right sidewall 7c in place of the left sidewall 7b.

Figure 5:
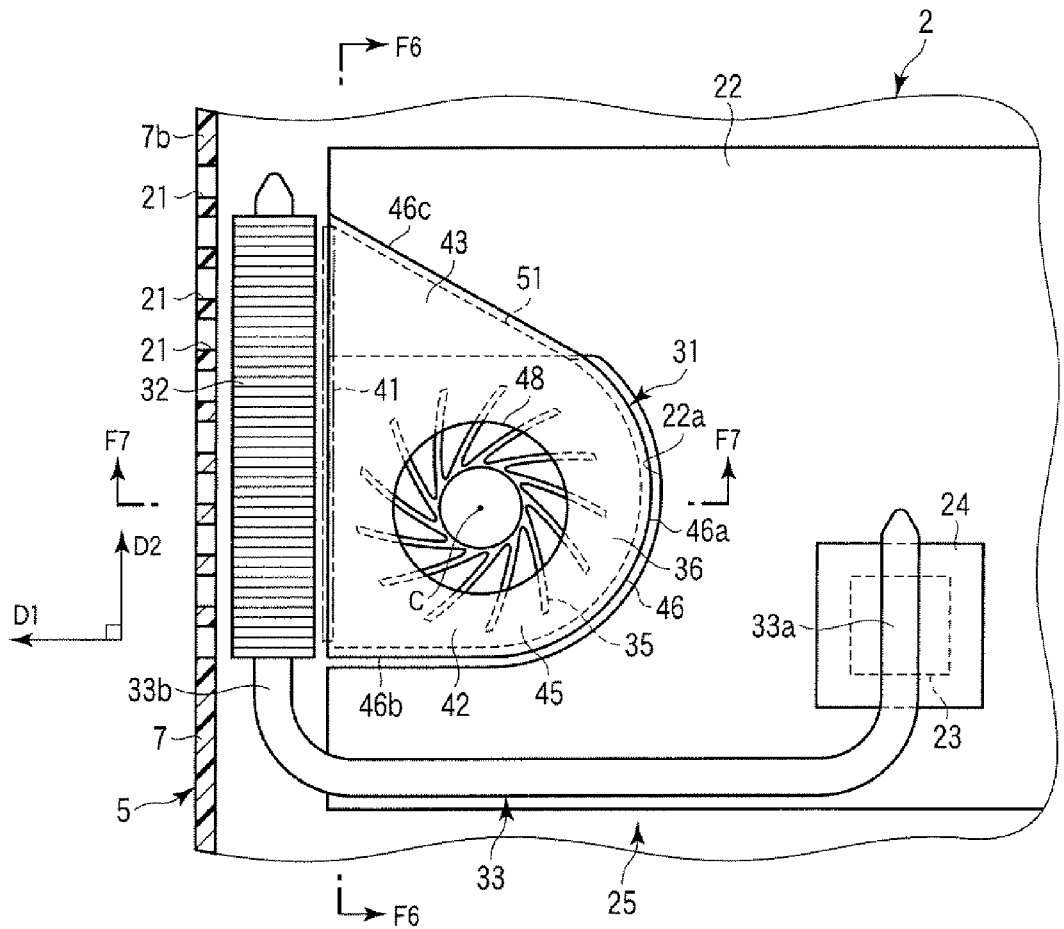
FIG. 5 is an exemplary sectional view of the portable computer shown in FIG. 1.

As shown in FIG. 5, a circuit board 22 is contained in the housing 5. The circuit board 22 is, for example, a main board (motherboard) having a contour larger than that of a cooling fan 31, which will be described later. The circuit board 22 is laid horizontally as it is contained in the housing 5.

A heating component 23 is mounted on the circuit board 22. The heating component 23 is an electronic component that produces heat during use. A CPU, graphic chip, Northbridge (trade name), and memory are specific examples of the heating component 23. However, the heating component as stated herein is not limited to these examples, and may be any of various components that require thermal radiation. A heat receiving member 24 formed of, for example, a metal plate is thermally connected to the heating component 23.

As shown in FIG. 5, a cooling structure 25 is disposed in the housing 5. Although the cooling structure 25 according to the present embodiment is used to cool, for example, the heating component 23, the cooling structure of the invention is not limited to this. The cooling structure according to the invention is widely applicable to various purposes, and may be formed of a simple cooling fan without radiator fins.

Figure 2:
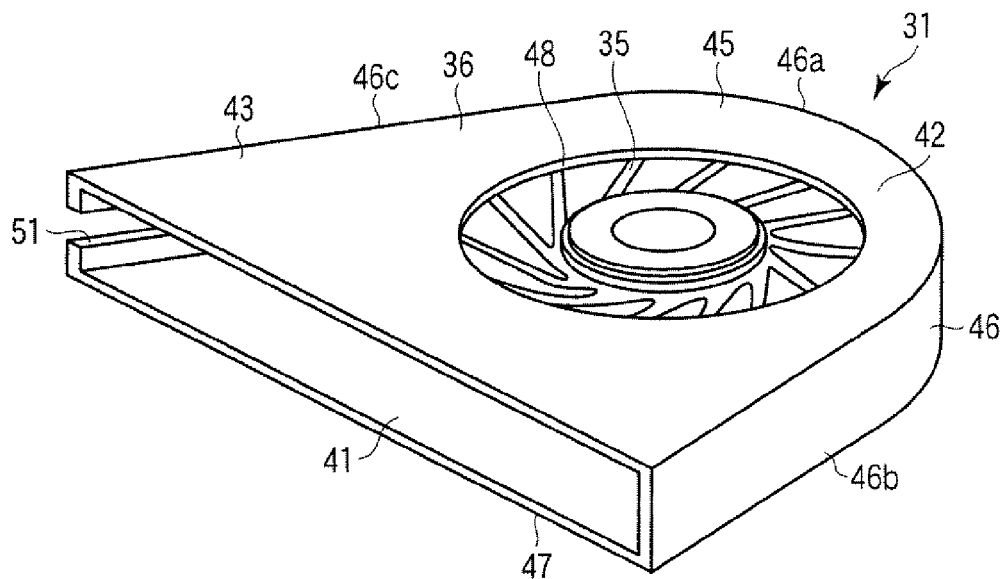
FIG. 2 is an exemplary perspective view of a cooling fan according to the first embodiment.
Figure 3:
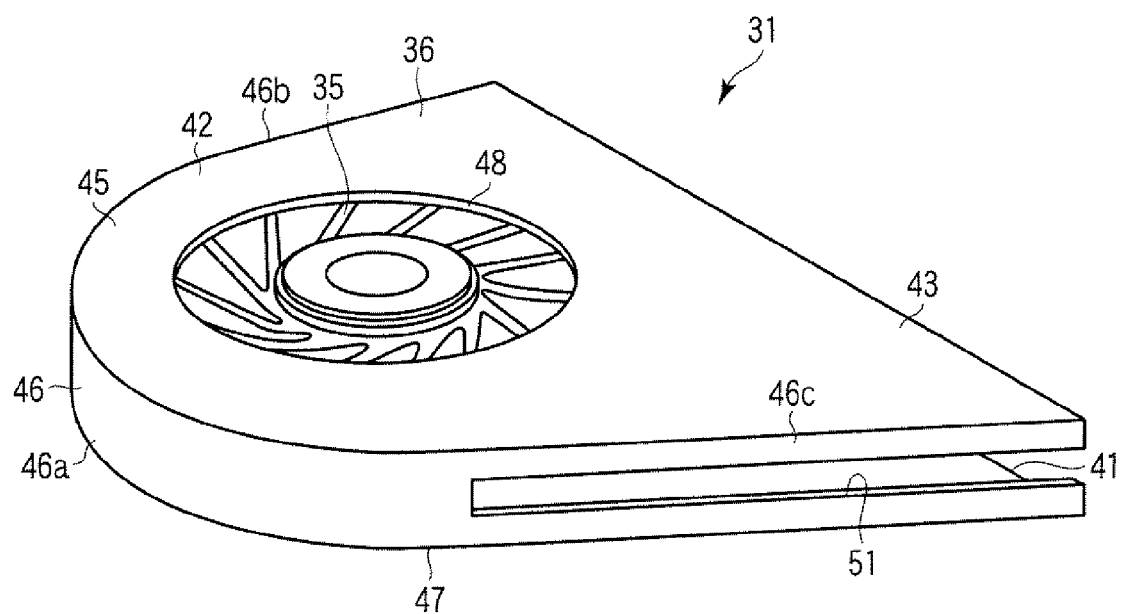
FIG. 3 is an exemplary perspective view of the cooling fan according to the first embodiment.
Figure 4:
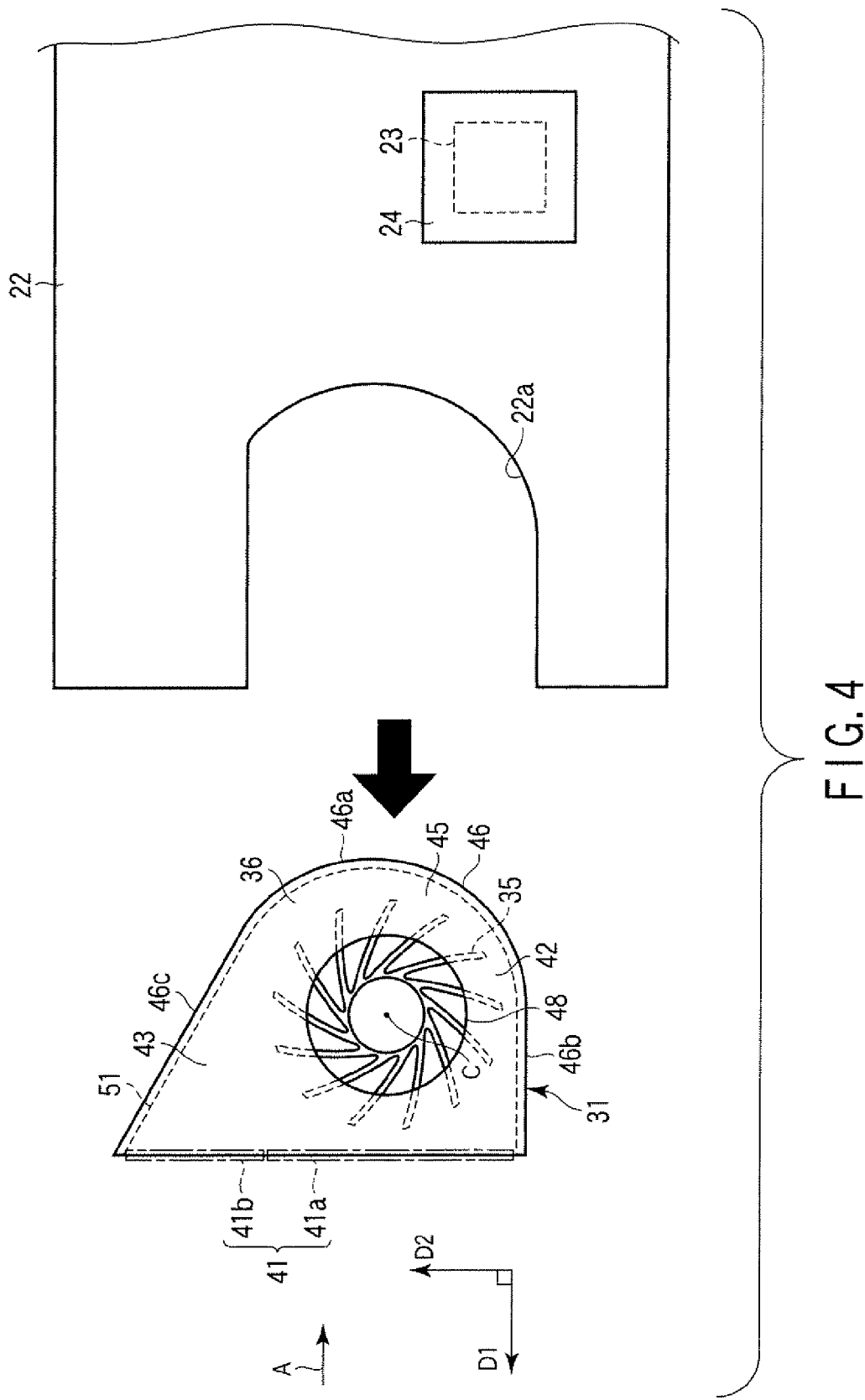
FIG. 4 is an exemplary plan view of the cooling fan and a circuit board according to the first embodiment.

As shown in FIG. 5, the cooling structure 25 according to the present embodiment is provided with a cooling fan 31, radiating member (heat sink) 32, and thermal transfer member 33. As shown in FIGS. 2 to 4, the cooling fan 31 is a centrifugal fan, which comprises fan blades (impeller) 35 and fan case 36.

The fan blades 35, which comprise a plurality of blades, is rotated by a motor (not shown) to blow air in its centrifugal direction. The fan case 36 of this embodiment is an example of a "casing" according to the present invention. The fan case 36 is a box that contains the fan blades 35.

As shown in FIG. 2, the fan case 36 comprises an exhaust port 41 opening in the centrifugal direction of the fan blades 35 with a respect to a rotation center C. As shown in FIG. 4, the exhaust port 41 opens in one direction. As shown in FIG. 5, the exhaust port 41 is oriented in the direction (i.e., first direction D1) from the cooling fan 31 to the exhaust holes 21 of the housing 5.

As shown in FIGS. 2 to 4, the fan case 36 comprises a casing main portion 42 and casing extension portion 43. The portions 42 and 43 are formed integrally with each other. The casing main portion 42 is formed to be one size greater than the fan blades 35 and contains the blades 35. The casing main portion 42 is opposed to the fan blades 35 axially relative thereto, that is, the two overlap each other when viewed vertically from above.

The casing extension portion 43 extends from the casing main portion 42 in a direction (hereinafter referred to as the second direction D2) perpendicular to the opening direction (first direction D1) of the exhaust port 41.

As shown in FIGS. 2 and 4, the exhaust port 41 is formed ranging from one horizontal end part of the fan case 36 to the other in the second direction D2 and comprises a relatively large opening. Specifically, the exhaust port 41 opens ranging from the casing main portion 42 to casing extension portion 43. In other words, the casing extension portion 43 is made to extend from the casing main portion 42 in order to enlarge the opening of the exhaust port 41.

Thus, as shown in FIG. 4, the exhaust port 41 comprises a first portion 41a, which is opposed to the fan blades 35 when viewed from its opening direction (i.e., in the direction of arrow A in FIG. 4), and a second portion 41b not opposed to the fan blades 35. The first portion 41a is formed in the casing main portion 42. The second portion 41b is formed in the casing extension portion 43.

As shown in FIG. 2, the fan case 36 comprises an upper surface portion 45, side surface portion 46, and lower surface portion 47. The upper and lower surface portions 45 and 47 are located above or below the fan blades 35 and opposed to the fan blades 35 axially relative thereto. The upper and lower surface portions 45 and 47 are each in the form of a plate that spreads horizontally. Each of the surface portions 45 and 47 is disposed ranging from the casing main portion 42 to casing extension portion 43. A suction port 48 opens in each of the surface portions 45 and 47.

As shown in FIGS. 2 and 3, the side surface portion 46 is an upright wall vertically extending between respective edge parts of the upper and lower surface portions 45 and 47. As shown in FIG. 4, the side surface portion 46 is disposed covering the entire circumference of the fan blades 35 except the exhaust port 41 and surrounds the fan blades 35 in its centrifugal direction with respect to the rotation center C. The side surface portion 46 comprises a first wall 46a, second wall 46b, and third wall 46c. The first and second walls 46a and 46b are provided in the casing main portion 42. The third wall 46c is provided in the casing extension portion 43.

As shown in FIG. 4, the first wall 46a is located on the opposite side of the fan blades 35 from the exhaust port 41. The first wall 46a extends in a curve along the outer rotational circumference of the fan blades 35. The second wall 46b of the fan case 36 is located on the opposite side of the fan blades 35 from the casing extension portion 43. The second wall 46b extends in the first direction D1 from one end part of the first wall 46a toward the exhaust port 41. The second wall 46b is opposed to the fan blades 35 in the second direction D2.

The third wail 46c is located on the opposite side of the fan blades 35 from the second wail 46b. The third wall 46c extends along the contour of the casing extension portion 43 from the other end part of the first wall 46a. The third wall 46c extends away from the fan blades 35 at an angle to the first direction D1, for example. The respective distal end parts of the third and second walls 46c and 46b and upper and lower surface portions 45 and 47 form the exhaust port 41.

As shown in FIG. 4, the third wall 46c stands upright beside the fan blades 35 and is opposed to the blades 35 in a direction perpendicular to the direction in which the exhaust port 41 opens. The third wall 46c is an example of a "wall" according to the present invention. The third wall 46c is opposed to the second portion 41b of the exhaust port 41 when viewed in the first direction D1.

The third wall 46c is configured to guide toward the exhaust port 41 air that is blown from the fan blades 35 in a direction (e.g., second direction D2) different from the opening direction of the exhaust port 41. The third wall 46c and casing main portion 42 are formed integrally with the fan case 36.

As shown in FIGS. 3 and 4, the fan case 36 is provided with a cut portion 51 into which a part of the circuit board 22 can be inserted. The cut portion 51 is formed in the third wall 46c. The cut portion 51 is, for example, a slit formed by partially cutting the third wall 46c. The cut portion 51 opens in a centrifugal direction different from the direction in which the exhaust port 41 opens, with respect to the rotation center C of the fan blades 35.

The cut portion 51 extends horizontally. The cut portion 51 is disposed in that region of the fan case 36 which does not overlap the fan blades 35 when viewed vertically from above. In other words, the cut portion 51 is formed in that region which does not overlap the fan blades 35 when viewed in the opening direction of the exhaust port 41 (i.e., in the direction of arrow A in FIG. 4).

Figure 6:
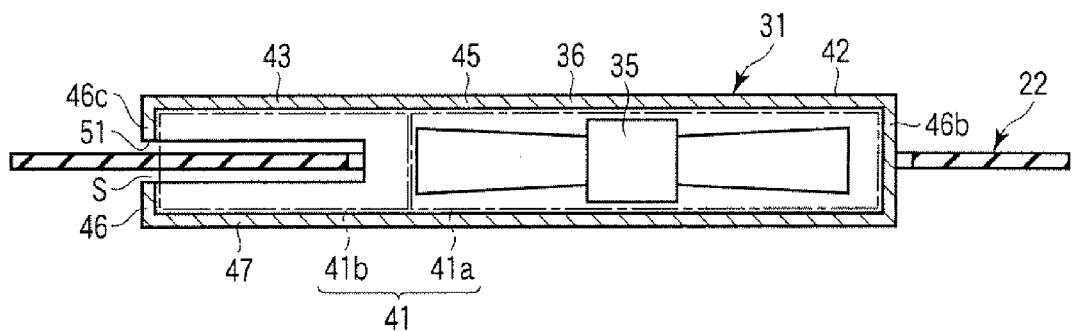
FIG. 6 is an exemplary sectional view of the cooling fan and circuit board taken along line F6-F6 of FIG. 5.
Figure 7:
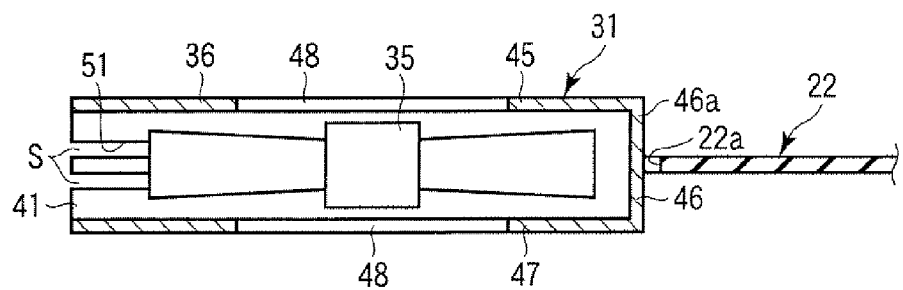
FIG. 7 is an exemplary sectional view of the cooling fan and circuit board taken along line F7-F7 of FIG. 5.

As shown in FIG. 4, the circuit board 22 has a cut portion 22a along the contour of the casing main portion 42 but does not have any cut portion corresponding to the contour of the casing extension portion 43. As shown in FIGS. 5 and 6, a part of the circuit board 22 is inserted into the cut portion 51 of the fan case 36 and penetrates the fan case 36. In other words, the circuit board 22 partially extends into the fan case 36 through the cut portion 51. As shown in FIG. 7, the distal end part of the circuit board 22 is flush with, for example, that surface of the cooling fan 31 on which the exhaust port 41 is formed.

As shown in FIGS. 6 and 7, the cut portion 51 is thicker than the circuit board 22. Thus, gaps S are formed between the circuit board 22 and cut portion 51. The gaps S absorb the part tolerances of the circuit board 22 and cooling fan 31.

As shown in FIG. 5, the radiating member 32 is located between the cooling fan 31 and the exhaust holes 21 of the housing 5. The radiating member 32 extends in the second direction D2 and is opposed to the exhaust port 41 of the cooling fan 31, substantially covering the overall length of the exhaust port 41. Thus, the radiating member 32 is opposed to both the first and second portions 41a and 41b of the exhaust port 41.

A heat pipe is an example of the thermal transfer member 33. The thermal transfer member 33 comprises a heat receiving end portion 33a and radiating end portion 33b. The heat receiving end portion 33a is thermally connected to the heating component 23 through the heat receiving member 24. The radiating end portion 33b is thermally connected to the radiating member 32. The thermal transfer member 33 moves some of heat received by the heat receiving end portion 33a to the radiating end portion 33b.

The following is a description of the operation of the portable computer 1.

When the portable computer 1 is powered, the heating component 23 produces heat. This heat is transferred to the radiating member 32 by the thermal transfer member 33.

When the fan blades 35 are rotated, the cooling fan 31 draws in air from the housing 5 through the suction port 48 and discharges the drawn-in air through the exhaust port 41. More specifically, much of air blown in the first direction D1 from the fan blades 35 is directly discharged toward the radiating member 32 through the first portion 41a of the exhaust port 41. Much of air blown in the second direction D2 from the fan blades 35 hits the third wall 46c and is redirected toward the exhaust port 41. Then, the redirected air is guided by the third wall 46c and discharged toward the radiating member 32 through the second portion 41b of the exhaust port 41.

According to the portable computer 1 constructed in this manner, the cooling performance of the cooling structure 25 can be improved without reducing the area of the circuit board 22 (i.e., board area). Specifically, the cut portion 51 is formed in the fan case 36 of the cooling fan 31, and a part of the circuit board 22 penetrates the interior of the fan case 36 through the cut portion 51. With this construction, the area of the circuit board 22 does not need to be reduced even though the cooling fan 31 has the relatively large fan case 36 that ensures the large exhaust port 41. Thus, the cooling performance of the cooling structure 25 can be improved without reducing the area of the circuit board 22.

In other words, the exhaust port 41 of the cooling fan 31 can be enlarged without affecting the area of the circuit board 22 by providing the fan case 36 with the cut portion 51 and extending a part of the circuit board 22 into the fan case 36. Thus, the airflow of the cooling fan according to the present embodiment can be made larger than that of a conventional cooling fan having the same blade shape.

In order to increase the airflow rate of the cooling fan 31, the fan 31 may be formed of a so-called bidirectional exhaust fan having two exhaust ports that are oriented in different directions. Since a battery and the like are mounted in the rear end part of the housing 5, however, it is difficult to dispose the exhaust holes 21 in the rear wall 7d. Since the front wall 7a of the housing 5 is assumed to face the user, moreover, it is not advisable to provide it with the exhaust holes 21. Thus, mounting the cooling fan of the bidirectional-exhaust type is not easy.

According to the present embodiment, on the other hand, the fan case 36 has the exhaust port 41 opening in one direction and the wall (third wall 46c) that stands upright beside the fan blades 35 and serves to guide air toward the exhaust port 41. With this arrangement, the unidirectional exhaust port 41 of the cooling fan 31 can be widened. Thus, the cut portion 51 can be formed in the wall without reducing the area of the circuit board 22.

If the casing main portion 42 and the wall are formed integrally with each other in the fan case 36, the cooling structure 25 of the present embodiment can be assembled relatively easily.

Second Embodiment

A portable computer 1 as an electronic apparatus according to a second embodiment of the invention will now be described with reference to FIG. 8. Like numbers designate configurations of the first and second embodiments having like or similar functions, and a description thereof is omitted. Further, other configurations than those described below are the same as those of the first embodiment.

Figure 8:
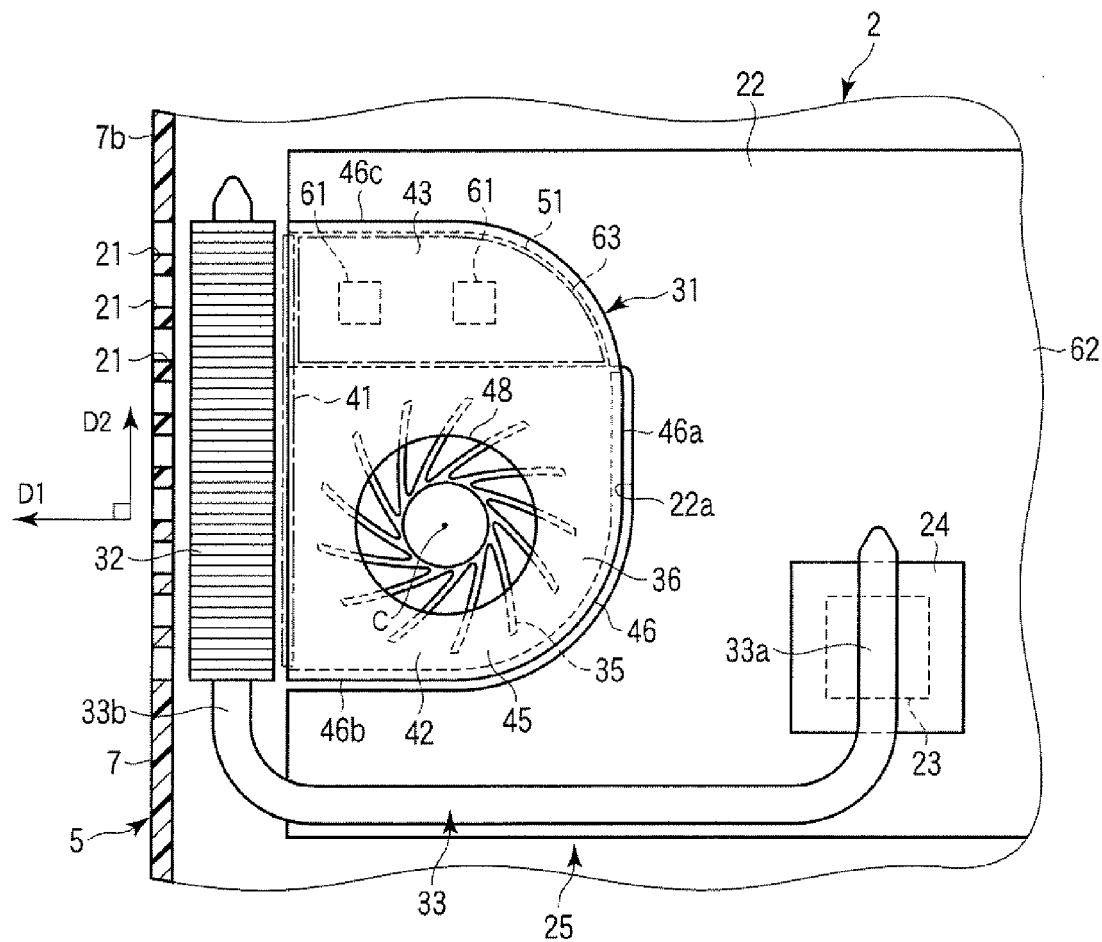
FIG. 8 is an exemplary sectional view of a portable computer according to a second embodiment of the invention.

As shown in FIG. 8, a third wall 46c of a fan case 36 of the present embodiment comprises a part that extends in an outwardly convex curve. Thus, the internal area of the fan case 36 of the present embodiment is greater than that of, for example, the fan case 36 of the first embodiment. The shape of third wall 46c is not limited to the aforementioned one. For example, the third wall 46c may be shaped so as to make room for electronic components mounted on a circuit board 22. Further, the shape of the third wall 46c may be identical to that of the first embodiment.

A first heating component 23 and second heating components 61 are mounted on the circuit board 22. The first heating component 23 corresponds to the heating component 23 described in connection with the first embodiment. The heating value of each second heating component 61 is smaller than that of the first heating component 23. A power supply unit is an example of the second heating component 61.

The circuit board 22 comprises a first region 62, which is located outside the fan case 36 when combined with a cooling fan 31, and a second region 63 within the fan case 36. The first heating component 23 is mounted in the first region 62. The second heating components 61 are mounted in the second region 63 and located within the fan case 36.

According to the portable computer 1 constructed in this manner, as in the first embodiment, the cooling performance of a cooling structure 25 can be improved without reducing the area of the circuit board 22. If the second heating components 61 are mounted in the second region 63 of the circuit board 22, moreover, they can be cooled within the fan case 36 by air blown directly from fan blades 35. Accordingly, the cooling fan 31 can cool the heating component 61 that needs to be cooled to a certain degree, although it does not require a cooling structure of the remote-heat-exchanger (RHE) type. Thus, the cooling performance of the cooling structure 25 can be further improved.

Third Embodiment

A portable computer 1 as an electronic apparatus according to a third embodiment of the invention will now be described with reference to FIG. 9. Like numbers designate configurations of the first to third embodiments having like or similar functions, and a description thereof is omitted. Further, other configurations than those described below are the same as those of the second embodiment.

Figure 9:
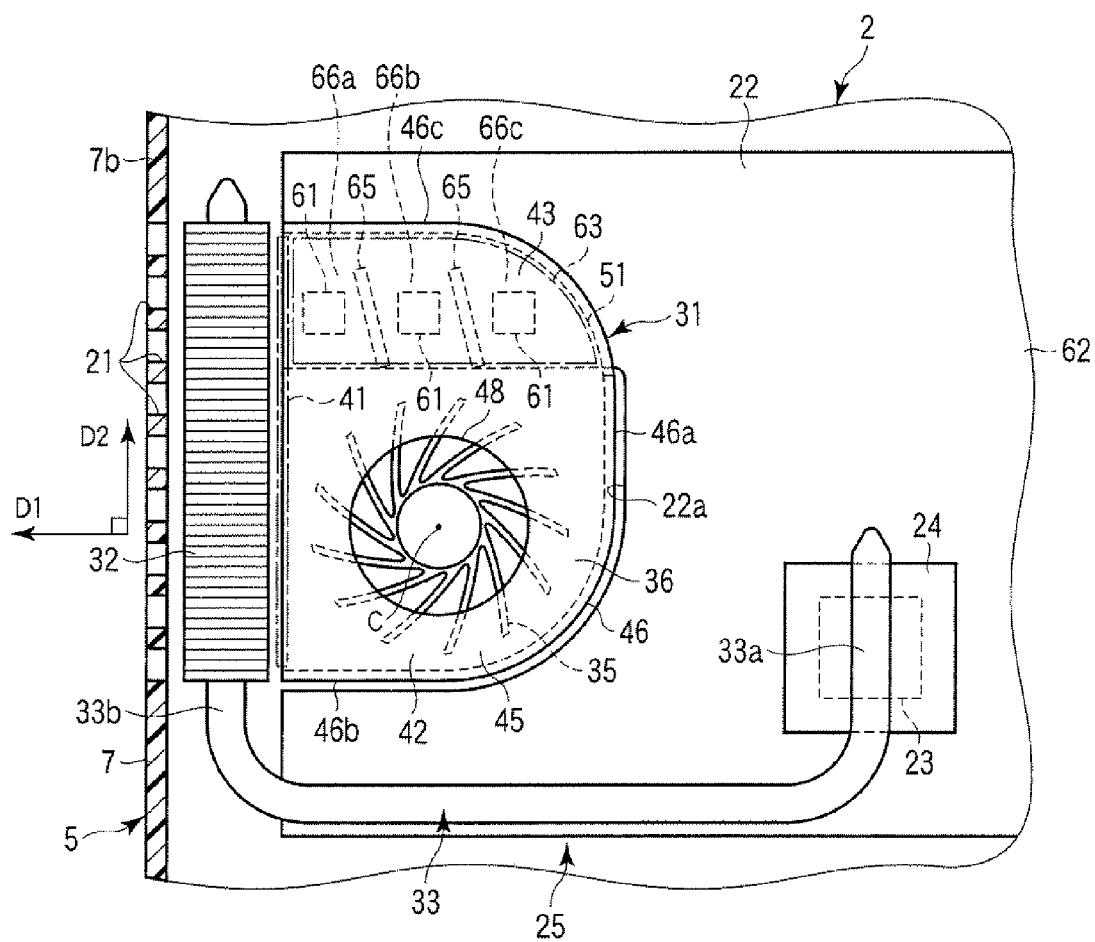
FIG. 9 is an exemplary sectional view of a portable computer according to a third embodiment of the invention.

As shown in FIG. 9, a plurality of second heating components 61 are mounted in a second region 63 of a circuit board 22. The second heating components 61 may be of the same or different types one another.

Partition members 65 extending along airflow are arranged individually between the second heating components 61. These partition members 65 divide the internal space of a fan case 36 into air channels 66a, 66b and 66c. The second heating components 61 are arranged in the air channels 66a, 66b and 66c, individually. Air currents delivered from fan blades 35 and passed through the air channels 66a, 66b and 66c join together in a position downstream of positions where the second heating components 61 are arranged.

According to the portable computer 1 constructed in this manner, as in the first and second embodiments, the cooling performance of a cooling structure 25 can be improved without reducing the area of the circuit board 22.

If the partition members 65 are provided, moreover, air warmed by passing by one of the second heating components 61 cannot further pass by another second heating component 61, so that relatively cool air can be fed around the heating components 61. Thus, the cooling performance of the cooling structure 25 can be further improved.

Fourth Embodiment

Figure 10:
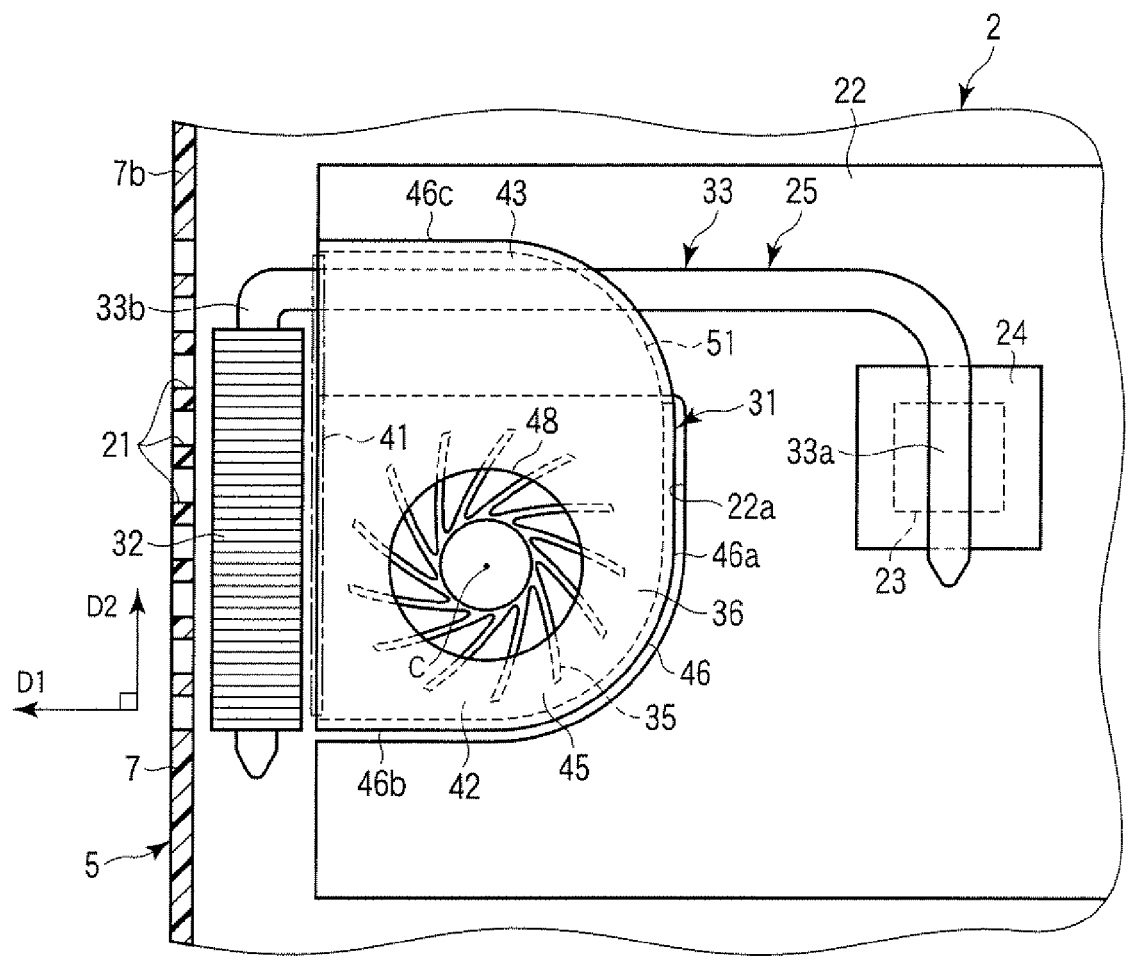
FIG. 10 is an exemplary sectional view of a portable computer according to a fourth embodiment of the invention.

A portable computer 1 as an electronic apparatus according to a fourth embodiment of the invention will now be described with reference to FIG. 10. Like numbers designate configurations of the first, second, and fourth embodiments having like or similar functions, and a description thereof is omitted. Further, other configurations than those described below are the same as those of the second embodiment.

At least a part of a cut portion 51 of a fan case 36 opens to a depth greater than the sum of the respective thicknesses of a circuit board 22 and thermal transfer member 33. The thermal transfer member 33 extends opposite and along a surface of the circuit board 22. A part of the thermal transfer member 33 faces a second region 63 of the circuit board 22 and overlaps the circuit board 22 as it penetrates the fan case 36 through the cut portion 51. This part of the thermal transfer member 33 extends within the fan case 36 and then to the outside of the fan case 36 through an exhaust port 41 thereof, for example.

According to the portable computer 1 constructed in this manner, as in the first embodiment, the cooling performance of a cooling structure 25 can be improved without reducing the area of the circuit board 22. If the thermal transfer member 33 extends penetrating the fan case 36, moreover, this part of the member 33 is cooled within the fan case 36 by air blown directly from fan blades 35. Thus, the cooling performance of the cooling structure 25 can be further improved.

Fifth Embodiment

A portable computer 1 as an electronic apparatus according to a fifth embodiment of the invention will now be described with reference to FIG. 11. Like numbers designate configurations of the first and fifth embodiments having like or similar functions, and a description thereof is omitted. Further, other configurations than those described below are the same as those of the first embodiment.

As shown in FIG. 11, a fan case 36 is provided with a casing main portion 42, first casing extension portion 43, and second casing extension portion 71. The first casing extension portion 43 corresponds to the casing extension portion 43 according to the first embodiment. In the present embodiment, the second casing extension portion 71 extends on the opposite side of the casing main portion 42 from the casing extension portion 43.

A second wall 46b extends along the contour of the second casing extension portion 71 from an end part of a first wall 46a. The second wall 46b extends away from fan blades 35 at an angle to the first direction D1, for example. An exhaust port 41 is formed raging from the casing extension portion 43 to second casing extension portion 71.

The second wall 46b and a third wall 46c are each provided with a cut portion 51. A part of a circuit board 22 is inserted into the cut portion 51 of each of the second and third walls 46b and 46c and penetrates the fan case 36.

According to the portable computer 1 constructed in this manner, as in the first embodiment, the cooling performance of a cooling structure 25 can be improved without reducing the area of the circuit board 22. If the fan case 36 extends on both sides of a casing main portion 42, the exhaust port 41 can be further widened. Thus, the cooling performance of the cooling structure 25 can be further improved.

Sixth Embodiment

A portable computer 1 as an electronic apparatus according to a sixth embodiment of the invention will now be described with reference to FIGS. 12 and 13. Like numbers designate configurations of the first and sixth embodiments having like or similar functions, and a description thereof is omitted. Further, other configurations than those described below are the same as those of the first embodiment.

As shown in FIG. 12, a cooling structure 25 according to the present embodiment is provided with gap closing members 75 for closing gaps S between a circuit board 22 and cut portion 51. As shown in FIG. 12, the gap closing members 75 extend horizontally (i.e., longitudinally) relative to the cut portion 51 so as to substantially cover the overall length of the cut portion 51. As shown in FIG. 13, the gap closing members 75 are interposed between the circuit board 22 and fan case 36.

The gap closing members 75 are formed of, for example, an elastic material and function as cushioning members. The gap closing members 75, which are formed of sponge or the like, are deformed depending on the part tolerances of the fan case 36 and circuit board 22 as they are contained between the case 36 and board 22. If the opening shape of the cut portion 51 is subject to irregularities, the gap closing members 75 can be shaped according to the irregularities as they are held between the circuit board 22 and fan case 36.

According to the portable computer 1 constructed in this manner, as in the first embodiment, the cooling performance of a cooling structure 25 can be improved without reducing the area of the circuit board 22.

If the gap closing members 75 for closing the gaps S between the circuit board 22 and cut portion 51 are provided, leakage of air through the gaps S are suppressed, so that the cooling performance of the cooling structure 25 is improved. If a surface-mounted component 76 and the like are mounted in that region of the circuit board 22 which penetrates the fan case 36, the depth of cut of the cut portion 51 of the fan case 36 increases, since the gaps are made relatively wide in consideration of the height of the component 76. It is particularly advisable to provide the gap closing members 75 in such a case.

FIG. 14 shows a modification of the gap closing members 75. The gap closing members 75 need not always be interposed as aforesaid between the circuit board 22 and fan case 36. Alternatively, as in this modification, the gap closing members 75 may be configured to face and close the gaps S between the circuit board 22 and cut portion 51 from outside the fan case 36.

Seventh Embodiment

A portable computer 1 as an electronic apparatus according to a seventh embodiment of the invention will now be described with reference to FIGS. 15 to 18. Like numbers designate configurations of the first and seventh embodiments having like or similar functions, and a description thereof is omitted. Further, other configurations than those described below are the same as those of the first embodiment.

As shown in FIG. 16, a cooling structure 25 according to the present embodiment is provided with a cooling fan 31, radiating member 32, thermal transfer member 33, and first and second windshield members 81 and 82. In the present embodiment, a fan case 36 of the cooling fan 31 and the first and second windshield members 81 and 82 cooperate with one another to form a casing 83.

As shown in FIG. 15, the cooling fan 31 according to the present embodiment is a bidirectional exhaust fan. The fan case 36 is formed to be one size greater than the fan blades 35 and contains the blades 35. The fan case 36 according to the present embodiment is a casing main portion 42, which is opposed to the fan blades 35 axially relative thereto.

The fan case 36 comprises first and second discharge ports 84 and 85. The discharge ports 84 and 85 open at right angles to each other. As shown in FIG. 16, the first discharge port 84 is oriented in the first direction D1 and opposed to exhaust holes 21 of a housing 5. The second discharge port 85 is oriented in the second direction D2.

As shown in FIG. 16, a circuit board 22 adjoins the second discharge port 85 of the fan case 36. The circuit board 22 has a cut portion 22a along the contour of the fan case 36 and does not overlap the fan case 36 when viewed vertically from above.

As shown in FIGS. 16 and 17, the cooling structure 25 according to the present embodiment is provided with the first and second windshield members 81 and 82 in, for example, two pairs. The first and second windshield members 81 and 82 are plate-like walls formed of an elastic material such as sponge.

The first windshield members 81 are opposed to the circuit board 22 at right angles to its surfaces. The two first windshield members 81 are separately located above and below the circuit board 22, for example. As shown in FIG. 16, each first windshield member 81 is opposed in spaced relation to the second discharge port 85 of the fan case 36 in a centrifugal direction (e.g., second direction D2) with respect to a rotation center C of the fan blades 35.

As shown in FIG. 16, each first windshield member 81 has first and second longitudinal end portions 81a and 81b. The first end portion 81a is further inward within the housing 5 than the second end portion 81b is. The first end portion 81a is located near the fan case 36. The second end portion 81b is an end portion opposite from the first end portion 81a and is located near the exhaust holes 21 of the housing 5. Each first windshield member 81 is inclined at an angle to the fan case 36 so as to become more distant from the fan case 36 as it extends from the first end portion 81a toward the second end portion 81b.

Figure 18:
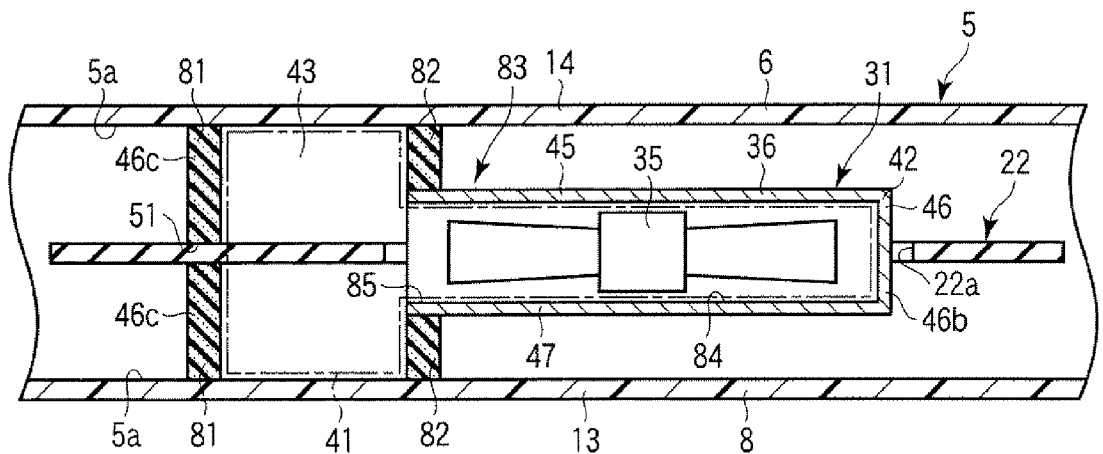
FIG. 18 is an exemplary sectional view of the portable computer taken along line F18-F18 of FIG. 16.

As shown in FIG. 18, each first windshield member 81 is interposed between the circuit board 22 and an inner surface 5a of the housing 5 and closes a gap between the circuit board 22 and inner surface 5a throughout its longitudinal length. More specifically, one of the first windshield member 81 is disposed between the circuit board 22 and an upper wall 6 (housing cover 14) of the housing 5. The other first windshield member 81 is disposed between the circuit board 22 and a lower wall 8 (housing base 13) of the housing 5.

In the present embodiment, as shown in FIGS. 16 to 18, an exhaust port 41 of the casing 83 is defined between the distal end part of the second wall 46b and those of the respective second end portions 81b of the first windshield members 81. The exhaust port 41 is oriented in the first direction D1.

The two first windshield members 81 of the present embodiment cooperate with each other to form an example of the "wall" according to the present invention. Each first windshield member 81 stands upright beside the fan blades 35 and faces the blades 35 at right angles to the opening direction of the exhaust port 41. Thus, in the present embodiment, the first windshield members 81 that are separate from the fan case 36 form the "wall" according to the present invention.

The first windshield members 81 are opposed to the exhaust holes 21 of the housing 5 in the first direction D1. The first windshield members 81 serve to redirect air discharged through the second discharge port 85 of the fan case 36 toward the exhaust holes 21. Specifically, the first windshield members 81 guide the air discharged through the second discharge port 85 of the fan case 36 to be discharged through the exhaust port 41 that is oriented in the first direction D1.

As shown in FIG. 18, a gap S that accommodates the circuit board 22 is defined between the two first windshield members 81. In other words, the two first windshield members 81 form a single large wall, which is formed with the cut portion 51 into which the circuit board 22 can be inserted.

A part of the circuit board 22 extends into the casing 83 through the cut portion 51. Thus, the circuit board 22 extends beyond the first windshield members 81 toward the fan case 36 from a position farther from the fan case 36 than the first windshield members 81 are.

As shown in FIGS. 16 and 18, the second windshield members 82 are interposed between the cooling fan 31 and the inner surface 5a of the housing 5. More specifically, one of the second windshield members 82 is disposed between the fan case 36 and the upper wall 6 (housing cover 14) of the housing 5. The other second windshield member 82 is disposed between the fan case 36 and the lower wall 8 (housing base 13) of the housing 5. The first and second windshield members 81 and 82 cooperate with each other to form an air channel that prevents the air discharged through the second discharge port 85 from proceeding to a suction port 48 of the cooling fan 31.

According to the portable computer 1 constructed in this manner, as in the first embodiment, the cooling performance of the cooling structure 25 can be improved without reducing the area of the circuit board 22.

If air channels through which air currents delivered in a direction different from the opening direction of the exhaust port 41 are redirected toward the exhaust port 41 are defined by the first windshield members 81 that are separate from the fan case 36, the structure of present invention can be realized by means of the cooling fan of the conventional bidirectional-exhaust type.

Eighth Embodiment

Figure 19:
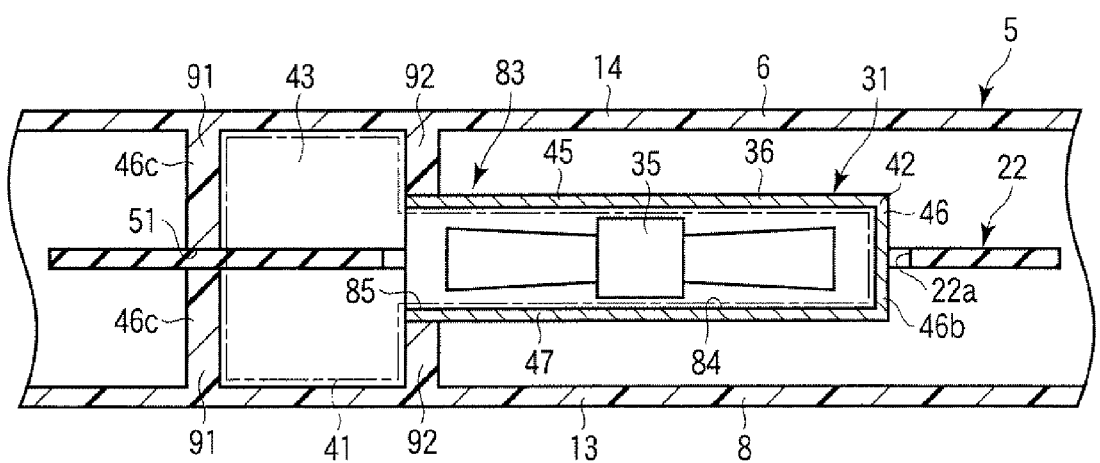
FIG. 19 is an exemplary sectional view of a portable computer according to an eighth embodiment of the invention.

A portable computer 1 as an electronic apparatus according to an eighth embodiment of the invention will now be described with reference to FIG. 19. Like numbers designate configurations of the first, seventh, and eighth embodiments having like or similar functions, and a description thereof is omitted. Further, other configurations than those described below are the same as those of the seventh embodiment.

A housing 5 according to the present embodiment comprises first and second projections 91 and 92. The first projections 91 are provided in upper and lower walls 6 and 8, individually, and project into the housing 5. The first projections 91 have the same shape and function as the first windshield members 81 of the seventh embodiment. Specifically, each first projection 91 stands upright beside fan blades 35 in a direction perpendicular to the opening direction of an exhaust port 41 and forms an example of the "wall" according to the present invention.

The second projections 92 are provided in the upper and lower walls 6 and 8, individually, and project into the housing S. The second projections 92 have the same shape and function as the second windshield members 82 of the seventh embodiment.

According to the portable computer 1 constructed in this manner, as in the first embodiment, the cooling performance of a cooling structure 25 can be improved without reducing the area of a circuit board 22.

Ninth Embodiment

A portable computer 1 as an electronic apparatus according to a ninth embodiment of the invention will now be described with reference to FIGS. 20 to 22. Like numbers designate configurations of the first and ninth embodiments having like or similar functions, and a description thereof is omitted. Further, other configurations than those described below are the same as those of the first embodiment.

A radiating member 32 comprises first and second portions 32a and 32b. The second portion 32b is opposed to a wall 46c of a fan case 36 with a cut portion 51 in the first direction D1. The first portion 32a is the remainder of the radiating member 32 excluding the second portion 32b.

Figure 21:
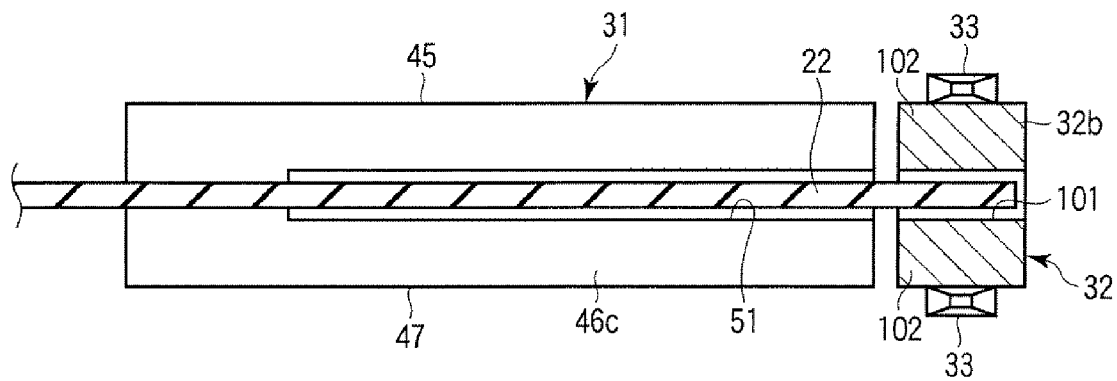
FIG. 21 is an exemplary sectional view of a thermal radiation member and circuit board taken along line F21-F21 of FIG. 20.
Figure 22:
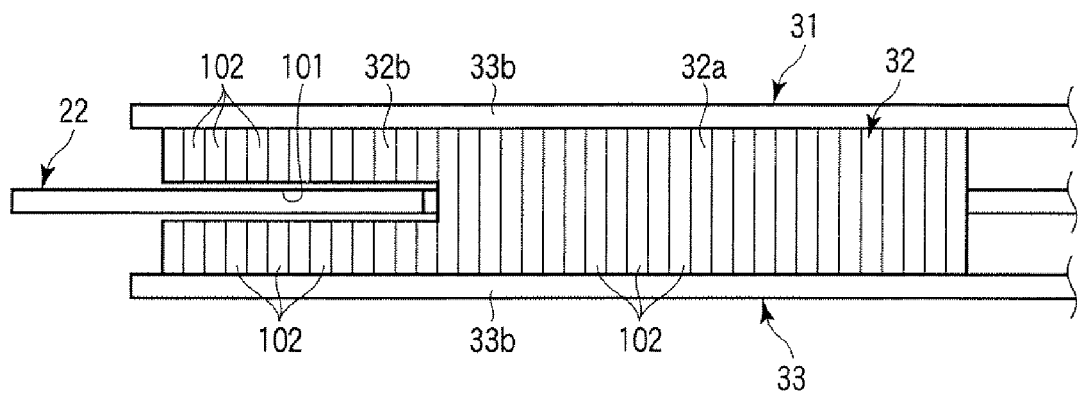
FIG. 22 is an exemplary front view of the thermal radiation member and circuit board taken from line F22-F22 of FIG. 20.

As shown in FIG. 22, the second portion 32b is provided with a cut portion 101 into which a part of a circuit board 22 can be inserted. More specifically, the second portion 32b of the radiating member 32 comprises fins 102 arranged above and below a region that forms the cut portion 101. As shown in FIG. 21, the cut portion 101 of the radiating member 32 is formed opposite the cut portion 51 of the fan case 36. On the other hand, no cut portion is formed in the first portion 32a of the radiating member 32.

As shown in FIGS. 20 to 22, a part of the circuit board 22 is inserted into the cut portion 101 and extends into the radiating member 32.

According to the portable computer 1 constructed in this manner, as in the first embodiment, the cooling performance of a cooling structure 25 can be improved without reducing the area of the circuit board 22. If the radiating member 32 comprises the cut portion 101 with the circuit board 22 partially extending into the radiating member 32, moreover, the circuit board 22 can secure a larger area.

Although the portable computers 1 according the first to ninth embodiments of the present invention have been described herein, the invention is not limited to these embodiments. The constituent elements according to the first to ninth embodiments may be suitably used in combination with one another. Further, the present invention is not limited directly to the embodiments described above, and its constituent elements may be embodied in modified forms without departing from the scope or spirit of the invention.

In the firth to ninth embodiments, for example, heating components may be mounted in that region of the circuit board which is inserted into the casing, as in the second embodiment, or partition members may be provided, as in the third embodiment. In the fifth to ninth embodiments, moreover, the thermal transfer member may be located so as to extend within the casing, as in the fourth embodiment. In the seventh to ninth embodiments, a second casing extension portion may be provided, as in the fifth embodiment. In the second to ninth embodiments, gap closing members may be provided, as in the sixth embodiment. In the seventh and eighth embodiments, the radiating member may be provided with a cut portion, as in the ninth embodiment.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
a housing;
a circuit board in the housing;
fan blades configured to rotate and blow air in a centrifugal direction; and
a casing which contains the fan blades and comprises an exhaust port and a cut portion which opens in a centrifugal direction different from a direction in which the exhaust port opens, from a perspective of a rotation center of the fan blades, and into which a part of the circuit board is inserted.

2. The electronic apparatus of claim 1, wherein the exhaust port opens in one direction, the casing comprises a wall which stands in a side of the fan blades, faces the fan blades in a direction perpendicular to the direction in which the exhaust port opens, and is configured to guide air blown from the fan blades toward the exhaust port, and the cut portion is formed in the wall.

3. The electronic apparatus of claim 2, wherein the casing comprises a casing main portion facing the fan blades axially relative thereto and is formed of a fan case integrally comprising the casing main portion and the wall.

4. The electronic apparatus of claim 2, wherein the casing comprises a fan case facing the fan blades axially relative thereto, and
the wall is formed of a windshield member interposed between the circuit board and an inner surface of the housing.

5. The electronic apparatus of claim 2, wherein the casing comprises a fan case facing the fan blades axially relative thereto, and
the wall is formed of a part of the housing which projects toward the circuit board.

6. The electronic apparatus of claim 1, further comprising a gap closing member which closes a gap between the circuit board and the cut portion.

7. The electronic apparatus of claim 1, wherein the circuit board comprises a heating component in a region within the casing.

8. An electronic apparatus comprising:
a housing;
a circuit board in the housing;
fan blades configured to rotate and blow air in a centrifugal direction; and
a casing comprising a fan case which contains the fan blades and comprises a first discharge port and a second discharge port, opening individually in directions perpendicular to each other, and a wall facing the circuit board in a direction perpendicular to a surface of the circuit board, facing the second discharge port with a space therebetween in a centrifugal direction from a perspective of a rotation center of the fan blades, and configured to guide air discharged through the second discharge port,
the circuit board extending beyond the wall toward the fan case from a position farther from the fan case than the wall is.

9. A cooling fan comprising:
fan blades configured to rotate and blow air in a centrifugal direction; and
a fan case which contains the fan blades and comprises an exhaust port and a cut portion which opens in a centrifugal direction different from a direction in which the exhaust port opens, from a perspective of a rotation center of the fan blades, and into which a part of a circuit board is insertable.

10. The cooling fan of claim 9, wherein the exhaust port opens in one direction, the fan case comprises a wall which stands in a side of the fan blades, faces the fan blades in a direction perpendicular to the direction in which the exhaust port opens, and is configured to guide air blown from the fan blades toward the exhaust port, and the cut portion is formed in the wall.

* * * * *